US012018563B2

(12) United States Patent
Uotila et al.

(10) Patent No.: US 12,018,563 B2
(45) Date of Patent: Jun. 25, 2024

(54) GROUND SUPPORT FOR MOBILE DRILLING RIG

(71) Applicant: SANDVIK MINING AND CONSTRUCTION OY, Tampere (FI)

(72) Inventors: Jarkko Uotila, Tampere (FI); Eero Viskari, Tampere (FI); Visa Toppinen, Tampere (FI); Tommi Kiviniemi, Tampere (FI)

(73) Assignee: Sandvik Mining and Construction Oy, Tampere (FI)

(*) Notice: Subject to any disclaimer, the term of this patent is extended or adjusted under 35 U.S.C. 154(b) by 0 days.

(21) Appl. No.: 18/023,541

(22) PCT Filed: Aug. 31, 2021

(86) PCT No.: PCT/EP2021/074006

§ 371 (c)(1),
(2) Date: Feb. 27, 2023

(87) PCT Pub. No.: WO2022/049067

PCT Pub. Date: Mar. 10, 2022

(65) Prior Publication Data

US 2023/0313613 A1 Oct. 5, 2023

(30) Foreign Application Priority Data

Sep. 1, 2020 (EP) .................................... 20193836

(51) Int. Cl.
*E21B 7/02* (2006.01)
*G08B 21/18* (2006.01)

(52) U.S. Cl.
CPC ............ *E21B 7/022* (2013.01); *G08B 21/182* (2013.01)

(58) Field of Classification Search
CPC .......... E21B 7/022; E21B 7/024; E21B 7/025; G08B 21/182
See application file for complete search history.

(56) References Cited

U.S. PATENT DOCUMENTS

| | | | | |
|---|---|---|---|---|
| 9,022,142 | B2 * | 5/2015 | Pirinen | E21B 19/167 175/24 |
| 9,082,288 | B2 * | 7/2015 | Wei | F04B 15/02 |
| 9,617,708 | B2 * | 4/2017 | Naik | E02F 3/32 |
| 10,151,191 | B2 * | 12/2018 | Viitaniemi | E21B 7/025 |
| 2007/0007040 | A1 * | 1/2007 | Bergstrand | E21B 19/16 175/57 |

(Continued)

FOREIGN PATENT DOCUMENTS

| | | |
|---|---|---|
| EP | 2725184 A1 | 4/2014 |
| WO | 98/23847 A1 | 6/1998 |

*Primary Examiner* — Steven A MacDonald
(74) *Attorney, Agent, or Firm* — Corinne R. Gorski

(57) ABSTRACT

A drilling rig includes a carrier, a ground support attached to the carrier for supporting the carrier on the ground, a drilling boom attached at a first end to the carrier, a feed beam attached to a second end of the drilling boom, a drilling unit attached movably along the feed beam, a ground pin attached to the feed beam for supporting the feed beam onto the ground, and control means configured for performing the steps of at least: receiving ground support force information indicative of force applied by the ground support to the ground, and detecting ground contact state of the ground pin on the basis of the received ground support force information.

15 Claims, 5 Drawing Sheets

(56) References Cited

U.S. PATENT DOCUMENTS

| | | | | |
|---|---|---|---|---|
| 2013/0036812 | A1* | 2/2013 | Pirinen | E21B 19/165 73/152.01 |
| 2013/0048378 | A1* | 2/2013 | Pirinen | E21B 19/167 175/24 |
| 2014/0015685 | A1* | 1/2014 | Wei | B66C 23/905 340/679 |
| 2017/0044849 | A1 | 2/2017 | Pitcher | |
| 2017/0074086 | A1* | 3/2017 | Viitaniemi | E21B 41/0021 |
| 2017/0234119 | A1 | 8/2017 | Allen et al. | |
| 2021/0180405 | A1* | 6/2021 | Gunda | E21B 47/06 |

* cited by examiner

GROUND SUPPORT FOR MOBILE DRILLING RIG

RELATED APPLICATION DATA

This application is a § 371 National Stage Application of PCT International Application No. PCT/EP2021/074006 filed Aug. 31, 2021 with priority to EP 20193836.2 filed Sep. 1, 2020.

FIELD

The present invention relates to supporting mobile rock drilling rigs to ground, and in particular to arranging ground support for drilling.

BACKGROUND

Mobile drilling rigs, such as top-hammer, down-the-hole (DTH) or rotary rock drilling rigs, are used in construction and mining sites. Rock drilling rigs usually comprise a carrier onto which a boom at its one end has been turnably assembled in vertical and horizontal directions in relation to the carrier. Further, at the other end of the boom there is a feed beam for a rock drill. The feed beam is orientated before drilling to its designed direction so that the hole will be drilled according to a predesigned plan precisely where the designer has intended to.

It is important that the feed beam is adequately supported to maintain the feed beam steadily in its position during the drilling. At the front end of the feed beam there is typically a ground pin, which is pressed against the surface before drilling. If the feed beam position changes due to inadequate or lost ground support, this may result into increased wear of the tools and/or bent hole.

SUMMARY

According to a first aspect, there is provided a mobile drilling rig or an apparatus for controlling a mobile drilling rig comprising a carrier, a ground support attached to the carrier for supporting the carrier onto the ground, a drilling boom attached at a first end to the carrier, a feed beam attached to a second end of the drilling boom, a drilling unit attached movably along the feed beam, a ground pin attached to the feed beam for supporting the feed beam onto the ground, further being configured to or comprising control means configured for performing at least: receiving ground support force information indicative of force applied by the ground support to the ground, and detecting ground contact state of the ground pin on the basis of the received ground support force information by comparing the received ground support force information to at least one predetermined threshold value, wherein the ground contact state indicates whether the feed beam is adequately supported to the ground for drilling.

According to a second aspect, there is provided a method for ground-supporting a drilling rig comprising a carrier, a ground support attached to the carrier for supporting the carrier onto the ground, a drilling boom attached at a first end to the carrier, a feed beam attached to a second end of the drilling boom, a drilling unit attached movably along the feed beam, a ground pin attached to the feed beam for supporting the feed beam onto the ground, the method comprising: receiving ground support force information indicative of force applied by the ground support to the ground, and detecting ground contact state of the ground pin on the basis of the received ground support force information by comparing the received ground support force information to at least one predetermined threshold value, wherein the ground contact state indicates whether the feed beam is adequately supported to the ground for drilling.

According to a third aspect, force applied by the ground pin to the ground is measured or defined on the basis of a measurement of at least one element of the drilling rig movable in relation to the carrier, wherein the element is affected by driving the ground pin onto the ground and the measurement is indicative of state change applied to the element due to driving the ground pin onto the ground. Ground contact state of the ground pin is detected or defined on the basis of the measured force. Examples of such elements include the ground support element attached to the carrier for supporting the carrier onto the ground, a boom, a feed beam, or a track system. The measurement may include measuring actuator (cylinder) hydraulic pressure, angle measurement, strain gauge, or another suitable measurement method. For example, boom lift cylinder pressure, feed tilt cylinder pressure, feed extension cylinder pressure, rear ground support pressure, or track system oscillation cylinder pressure may be applied for this purpose.

According to a fourth aspect, there is provided an apparatus comprising at least one processor, at least one memory including computer program code, the at least one memory and the computer program code being configured to, with the at least one processor, cause the apparatus at least to perform a method according to any of the aspects, or an embodiment of the method.

According to a fifth aspect, there is provided a computer program, a computer program product or (a non-tangible) computer-readable medium comprising computer program code for, when executed in a data processing apparatus, to cause the apparatus to perform a method according to any of the aspects, or an embodiment thereof.

EMBODIMENTS

Figure 1:
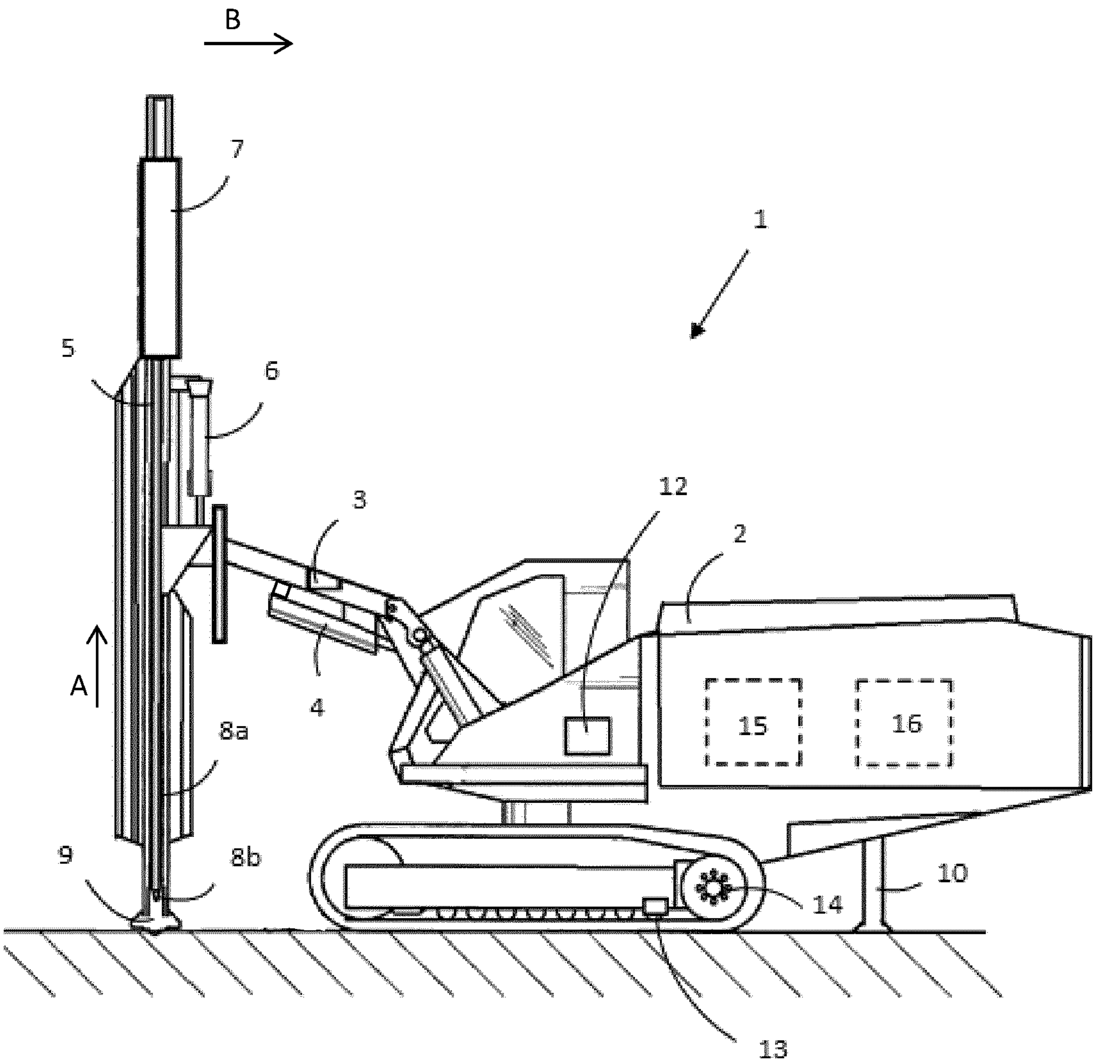
FIG. 1 illustrates an example of a mobile drilling rig.

As an example of a mobile drilling rig in which at least some of the present embodiments may be illustrated, FIG. 1 illustrates a rock drilling rig 1 comprising a carrier 2 with tracks 13. A (drilling) boom 3 with at least one actuator 4 is attached at a first end to the carrier 2. The boom may comprise two or more parts, object, or portions connected by a joint. A feed beam 5 with an actuator 6 is arranged in or attached turnably to other end of the boom 3. There are many implementation options for attaching the feed beam 5 turnably to the boom 3. The boom may be attached to the carrier immovably or it may be connected to the carrier with one or more joints that enable turning of the boom in relation to the carrier in different directions. The boom may be of any known type, such as a boom having a single boom part attached at one end to the carrier of the apparatus and a feed beam attached to the other end of the boom part, a swivel boom having two or more boom parts with joints connecting the boom parts together, a telescopic boom or another boom type suitable for drilling rig.

A drilling unit 7, such as a rock drilling machine or rock drill as referred to as below, is attached to the feed beam 5 such that the drilling unit 7 movable along the feed beam 5 (in its longitudinal direction). A tool a drill string 8*a* and a drill bit 8*b* is connected to the rock drill 7. Impact pulses from percussion device of the rock drill are transmitted via the tool to rock to be drilled.

A ground pin 9 is attached to the feed beam 5 for supporting the feed beam onto the ground. The ground pin 9 comprises one or more portions pushed to the ground to support the feed beam for drilling. When pushed against the ground, the ground pin 9 may enter into the ground or, if the ground is hard, such as solid rock, the support remains against the surface. The ground pin 9 may be a separate element attached to the feed beam or it may be a solid part of the feed beam 5 or any solution known in the art.

At least one ground support is attached to the carrier 2 for supporting the carrier onto the ground. In the present example, the drilling rig 1 comprises a rear (ground) support 10 attached to the carrier 2 for supporting at least the rear portion of the carrier for drilling. When the carrier is positioned for drilling, the support 10 may be extended onto the ground to stabilize the carrier. Tracks 13 of the drilling rig 1 may be pivoted to an oscillation shaft 14. Oscillation cylinders (not shown) control relative positions of the tracks.

The drilling rig 1 further comprises a motor 15, such as a combustion engine and/or an electric motor. The drilling rig 1 typically comprises a system 16 of pumps for generating hydraulic pressure for operating various parts of the machine, such as actuating the boom 3 and the feed beam 5, etc. The drilling rig 1 may comprise one or more other sources of energy, such as an accumulator, a hydrogen container, a fuel tank, etc.

The drilling rig 1 further comprises at least one control unit 12 arranged to control operations of the drilling rig 1, such as actuators of the drilling rig 1. The control unit 12 may comprise one or more processors executing computer program code stored in a memory, and it may comprise or be connected to a user interface with a display device, as well as operator input interface for receiving operator commands and information to the control unit. The control unit may be connected to one or more other control units of a control system of the vehicle, in some embodiments by a controller area network (CAN) bus. In some embodiments, the control unit 12 is configured to control one or more operations of fully or partially automated drilling work cycle, at least ground support stabilization related operations, and there may be one or more other control units in the rig for controlling other operations.

The control unit 12 may be connected to sensors (not shown). For example, the control unit 12 may be connected to sensors that sense the turning angles or orientations or positions between the boom and the carrier, the feed beam and the carrier, or the boom and the feed beam. Such sensors may locate in connection with the respective rig element 3, 5, or alternatively the sensing may be executed remotely from the carrier or even elsewhere. The sensing data may be provided to the control unit 12 (or another control unit for positioning), which may execute appropriate computations.

The drilling rig 1 may comprise various further units, such as a global positioning system (GPS) unit or another global navigation satellite system (GNSS) unit, to position the drilling rig (and a part thereof) and navigate the drilling rig from hole to another. The drilling rig 1 may comprise one or more scanners configured to perform e.g. 3D laser scanning of the environment. Such scanning data may in some cases be applied to determine relational positions of components of the drilling rig 1, such as position of the feed beam 5. The drilling rig 1 may also comprise a wireless communications unit, configured for data transfer with a base station and/or a user device. The communication device may thus be connected to a communications system of the worksite, such as a wireless access system comprising a wireless local area network (WLAN) and/or a cellular communications network (e.g. a 4G, 5G or another generation cellular network). For example, the drilling rig may be remotely monitored and controlled based on state data from the drilling rig and control data from a remote controller unit.

It is to be appreciated that FIG. 1 provides only one example and various other configurations are applicable. It is to be also noted that in some alternative embodiments the drilling rig is unmanned. Thus, the user interface may be remote from the machine and the machine may be remotely monitored and controlled by a remote control unit.

Figure 2:
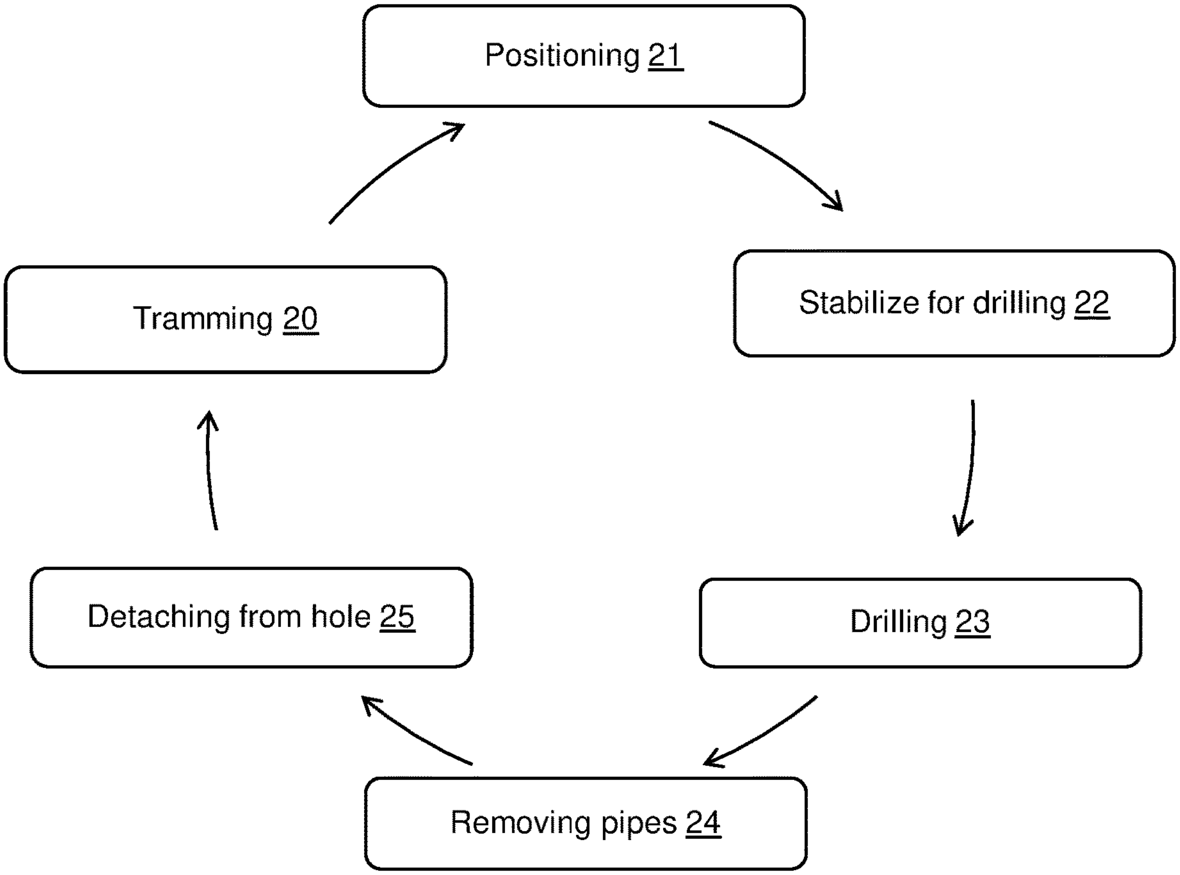
FIG. 2 illustrates example automatic drilling work cycle.

The drilling rig 1 may be configured to operate autonomously at least some operations, such as at least some of operations of an example working cycle of FIG. 2. The drilling rig 1 may in its autonomous operating mode operate independently without requiring continuous user control but which may be taken under external control in response to an operator alert or automatic operation terminating, for example. In some embodiments, the drilling rig 1 is configured to perform automatic drilling cycle, such as the operations of FIG. 2.

The drilling rig 1 may be trammed 20 in proximity of a target hole. A drilling pattern or plan, is defining target holes and hence work tasks carried out by the drilling rig, and may be used as an input for automatic control of the drilling rig 1. Based on hole position data in the drilling plan and position data from the GNSS unit, the control unit 12 may generate steering instruction and associated control signal to operate the tracks 13 to tram the drilling rig close to a target hole. The boom and the feed beam may be controlled to position 21 the feed beam tool at the defined hole position, at appropriate alignment based on hole orientation defined in the plan. The plan may thus define a plurality of target poses for a work machine of the mine vehicle, such as hole positions and orientations, on the basis of which automatic movement control actions (for the carrier 2, the boom 3, and/or the feed beam 5) are computed and associated control signals generated in block 20 and 21. The plan may be designed offline and off-site, for example in an office, or on-board the drilling rig. Such plan may be sent via a wired or wireless connection to, or otherwise loaded to a memory of the rock drilling rig 1 for access by the control unit 12. It is to be noted that there may be also certain other predefined target poses for the drilling rig 1 and/or the boom, such as a predefined boom and feed beam tramming pose applied when the drilling rig 1 is trammed 20 between holes of the plan.

The drilling rig 1 is stabilized 22 for drilling. Thus, at least one ground support 10 and the ground pin 9 may be pushed onto the ground. The ground support(s) may be pushed onto the ground before the ground pin; or the ground pin 9 is pushed onto the ground first. When the ground pin 9 is pushed onto the ground, front portion (closer to the boom and feed beam assembly) of the tracks 13 may rise (in direction A, and/or to another direction if the ground under the carrier is uneven), which may cause orientation change of the feed beam (in direction B).

In some embodiments, the control unit is configured to control orientation correction of the feed beam 5 to compensate for orientation change caused by pushing the ground pin 9 onto the ground. For example, features disclosed in par. 0040-0053 of EP2725184 may be applied. After drilling stage or mode 23, pipes or drill strings may be removed 24 (and placed into cassette), the feed beam may be detached 25 from the drilled hole, and the rig trammed 20 to a subsequent hole of the drilling plan.

The operator of the rock drilling rig 1 may control the drilling, as well as other operations, interactively with the control unit 12. An operator confirmation input may be required for transitioning between at least some of the stages (not shown).

Ground pin support force (in direction A) is essential to high-quality drilling, having impact on hole straightness, drilling accuracy, and tool wear. There is a need to completely automate the working cycle of a drilling rig. A challenge for stabilization for drilling is how to detect that the feed beam is adequately supported. This has required operator's manual intervention, based on visual detection and/or haptic sensation from a controller.

There are now provided improvements for determining if the feed beam is appropriately supported, further facilitating automated drilling cycle operations, further illustrated below.

Figure 3:
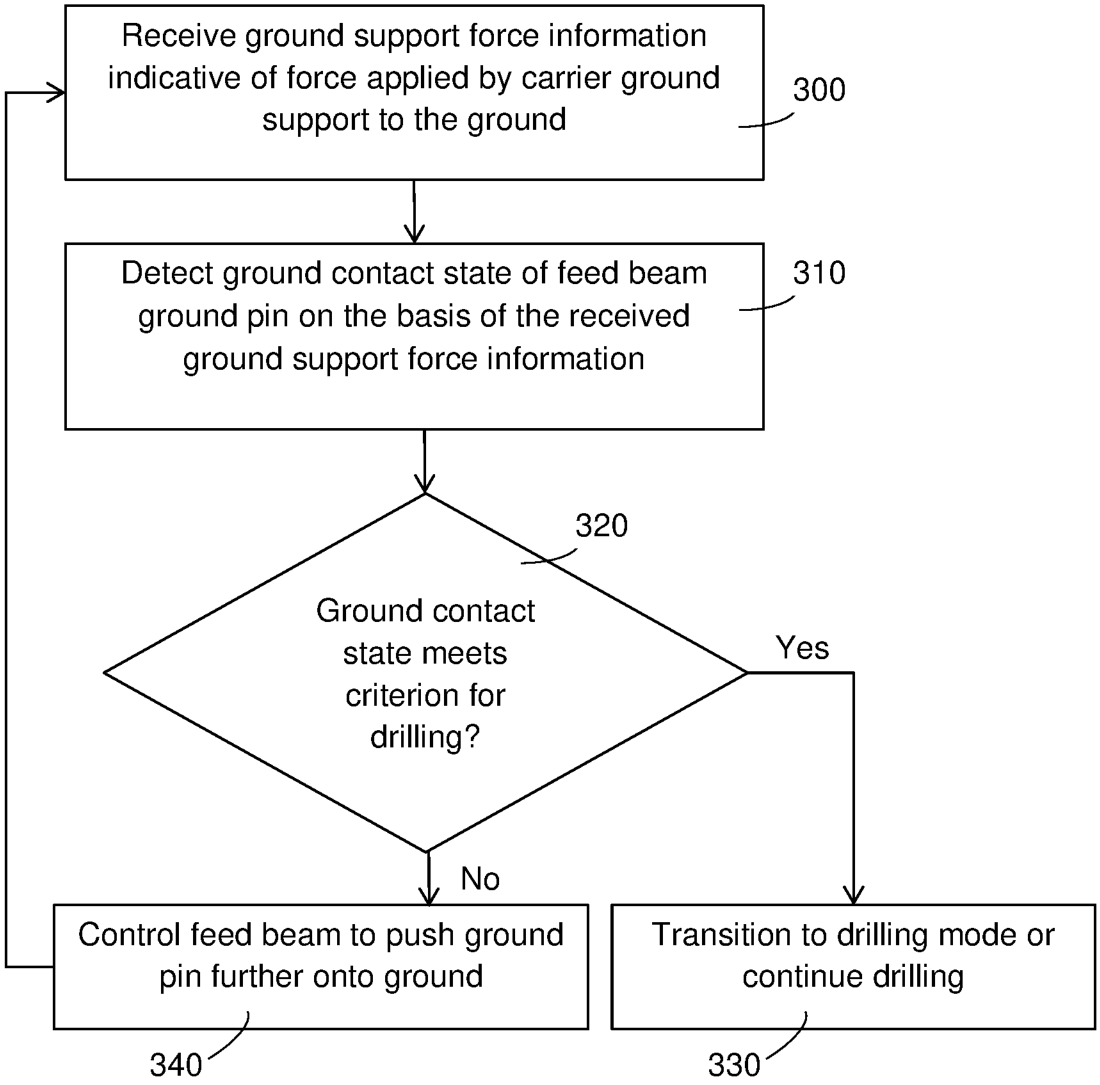
FIGS. 3 and 4 illustrate methods according to at least some embodiments.

FIG. 3 illustrates a method according to some embodiments. The method may be performed by drilling rig, such as the drilling rig 1 and the control unit 12 thereof.

The method comprises receiving 300 ground support force information indicative of force applied by carrier ground support, such as the rear ground support 10 as in the example embodiments below, to the ground. Ground contact state of feed beam ground pin, such as the ground pin 9 as in the example embodiments below, is detected 310 on the basis of the received ground support force information.

Ground support refers generally to means for supporting the carrier to ground, to enable adequate stability for drilling. At least one ground support device, such as jack, may be extendable to the ground to provide the further support the track-mounted carrier for drilling. In some embodiments, there is a three-point support for drilling, by the rear support 10, front portion (closer to the boom and feed beam assembly) of the tracks 13, and the feed beam ground pin 9. However, it is to be appreciated that this is, and FIG. 1 provides only an example of applicable mobile drilling rig support structure and various other implementation options are available. For example, the drilling rig may have a ground support at another position of the drilling rig (e.g. a support at middle or rear portion of the carrier), or multiple ground supports are applied to provide ground support force information.

The (feed beam) ground pin refers generally to an arrangement for supporting the feed beam onto the ground for drilling. The ground pin may comprise one or more pin-like support elements, but it is to be appreciated that multitude of forms and support structures suitable for supporting the feed beam onto the ground may be used. The support information may be indicative of the support force for the ground pin explicitly, or implicitly in dependency of the force. The ground pin contact state may be directly obtained based on the received ground support force information, such as measurement values, or the received ground support force information is further processed to obtain the ground pin contact state. For example, the control unit 12 may be configured to compare received ground contact force information values (or resulting state values) and detect change in the values.

The ground contact state of the ground pin defined in block 310 may be applied for controlling the drilling rig, depending in which work cycle stage the rig currently is. FIG. 3 also further illustrates some example embodiments for controlling drilling mode related operations based on the ground contact state.

Block 320 comprises checking if ground contact state meets predefined criterion for (allowing) drilling. Specific ground contact state value may be generated in block 310 based on processing the received ground support force information (and used in block 320), but in some embodiments received measurement values received in block 300 are applied on block 320. This may comprise comparing incoming sensor information (or further dependent state value) to one or more absolute and/or proportional threshold values, such as the information illustrated in further embodiments below to determine if adequate ground support for (feed beam) for drilling is available.

When the method is applied before starting drilling, during driving the ground pin onto the ground, the control unit 12 may in block 320 define if the ground contact state meets predetermined ground support drilling mode (entering) criterion. This criterion may be specifically set as condition for transitioning from stabilization mode or stage 22 to step 23 and may include comparison of a received ground support information or ground contact state value(s) to an associated threshold value. If yes, transition to drilling mode or stage 23 may be allowed in block 330. If not, the feed beam may be controlled to further push the ground pin onto the ground 340, again receive ground support force information and perform the method.

In autonomous drilling, it is also important that adequate ground contact is maintained, to avoid the feed beam 5 to changing their pose. When drilling on weak ground, ground can collapse and support weakened. This may cause misalignment and deviation in drilling hole. In some embodiments, the method of FIG. 3 is applied during the drilling to automatically monitor state of ground support for the feed beam and define if drilling may be continued. The method may thus be applied in real-time during execution of a drilling plan assigned for the drilling rig. Block 330 may comprise allowing continuing drilling (and return to block 300 for continuing monitoring for ground contact state). In some embodiments, re-supporting operation(s) may be automatically performed during the drilling mode 23 to improve feed beam support state.

Hence, the ground pin 9 ground contact state, and if the feed beam 5 is adequately supported to the ground for drilling i.e. current support force for the ground pin by the ground (in direction A), may be defined via carrier 2 ground support 10 state and current force by ground to the ground support. Ground pin 9 support force and the ground contact state may be estimated based on the ground support force of the carrier ground support, in some embodiments based on hydraulic pressure measurement information. This enables automatic checking for adequate ground support for drilling and to avoid manual operation or confirmation by an operator. It is to be noted that various modifications and further embodiments may be applied for the method, some example embodiments being further illustrated below. For example, threshold values may be different for the different modes in block 320.

In an example embodiment, an operator may be alerted or current operation mode or stage suspended. In some examples, the operator is alerted and drilling is suspended if the ground pin has been extended fully and/or adequate ground contact state meeting the criterion for drilling cannot be obtained due to multiple attempts. For example, one or two automatic re-supporting events may be allowed.

The control unit 12 may be configured to compare received (ground) support force information (or change thereof) to a predetermined loss of support threshold value (feed beam for drilling). The control unit may detect loss of adequate ground support for the feed beam in response to detecting, based on the received ground support force information that the force associated with the ground support meets the predetermined loss of support threshold value, e.g. falls below threshold (minimum) pressure value or that the change in the ground support force exceeds a threshold value.

In another example embodiment, if adequate ground contact cannot be achieved, transition to drilling mode is prevented, automatic operation sequence is suspended, and the operator is alerted. The control unit 12 may, due to entering block 340, control also other rig units or elements, such as control further extension of the rear ground support 10 onto the ground.

The support force information in block 300 may be indicative of hydraulic pressure and received from a pressure sensor attached to a cylinder actuating the ground support 10. Some further embodiments are illustrated below with references to pressure measurement information. However, it is to be appreciated that instead of or in addition to pressure measurements, other force measurement techniques may be applied to determine input for block 300 and/or 310 and the ground support force information, such as strain gauges.

Further input(s) may be applied for defining the ground pin contact state in block 310. In a further example embodiment, angular measurements are applied in block 310. For example, a sensor configured to measure angular position change affected or caused by driving the ground pin 9 onto the ground may be attached e.g. to a track system 13 oscillation axle. In another example, angular position information from a carrier inclinometer is applied.

In some embodiments, the ground support force information is indicative of force applied by the rear support 10 to the ground. The ground contact state of the ground pin 9 may be detected 310 on the basis of the received rear support actuation cylinder hydraulic pressure information. In an embodiment, a pressure transmitter is added to the rear ground support 7. Application of rear support pressure information has been tested and it has been found to indicate adequately ground pin force change and to be used as basis for determining if an adequate ground pin ground contact or engagement has been achieved for drilling. This also enables simple instrumentation, also to existing fleet of drilling rigs, with an adapter to the hydraulic cylinder.

However, it is to be appreciated that also other input may be applied as the ground support force information in block 300, instead of or in addition to the rear ground support force information. In an embodiment, oscillation cylinder pressure information is alternatively or additionally applied as input for block 310. Thus, the control unit 10 may receive oscillation cylinder hydraulic pressure information, indicative of hydraulic pressure in oscillation cylinders of the track system of the drilling rig, affected by driving the ground pin 9 onto the ground. In an embodiment, the geometry of the drilling rig may be such that no separate (rear/extended) ground support 10 is necessary but the track system 13 may be provide adequate ground support and operate as only carrier ground support. The ground contact state of the ground pin may be detected 310 on the basis of the received oscillation cylinder hydraulic pressure information.

In another embodiment, feed beam actuation cylinder pressure information is applied as input for block 310. This may be indicative of feed beam tilt force. In a still another embodiment, boom actuation cylinder pressure information is applied as input in block 300. This may be indicative of the boom lift force.

Figure 4:
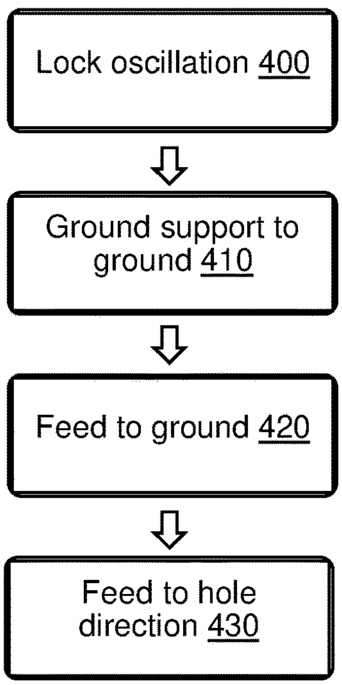

FIG. 4 further illustrates example stabilization procedure for the drilling rig according to an embodiment, which may be applied e.g. in block 22. The stabilization procedure may be entered automatically from the preceding work cycle stage upon meeting stage transition criteria, or in response to receiving an input from the operator of the rig. Track oscillation is locked 400 and the ground support is extended 410 to ground. This may comprise the control unit 12 controlling the rear ground support down until rear ground support hydraulic pressure meets a ground contact threshold value.

Feed beam 5 and the ground pin 9 is controlled 420 onto the ground, by applying the method of FIG. 3. This may be include controlling feed extension down until rear ground support 10 pressure level meets a predefined pressure threshold value, for example. Feed beam 5 is aligned 430 to designed hole direction.

It is to be noted that some of the stages may be performed in another order. For example, the feed beam 5 may be oriented before pushing the ground pin 9 against the ground to its designed direction.

Figure 5:
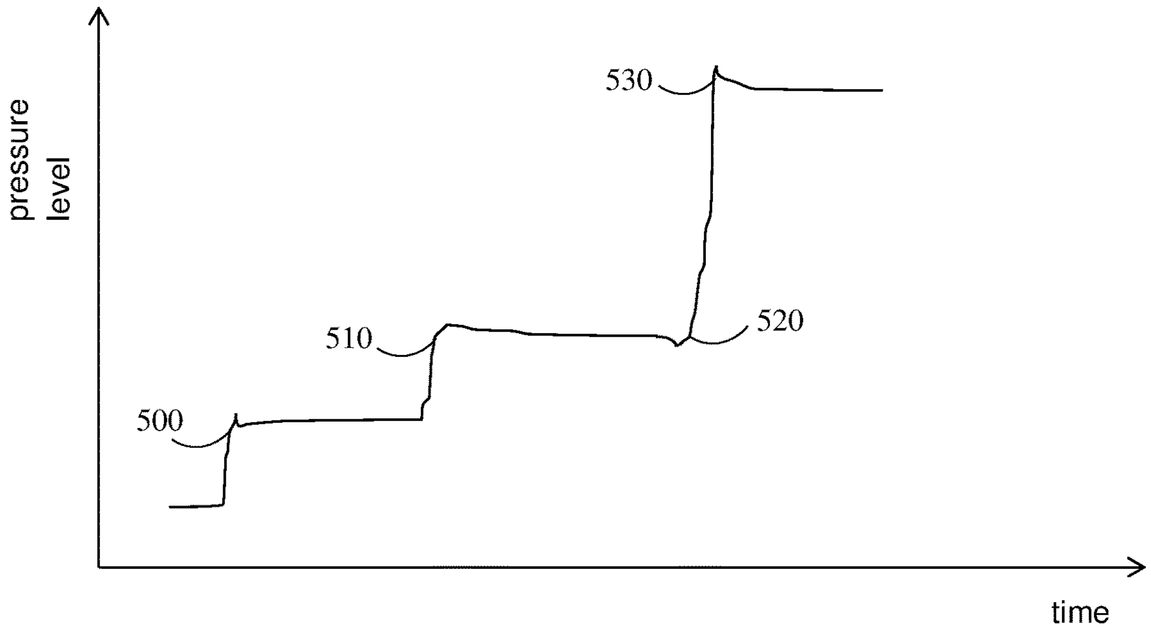
FIG. 5 illustrates example ground support measurements.

FIG. 5 illustrates a simplified example of detected pressure levels for rear ground support (y axis) and associated detection events over time (x axis). The rear ground support 10 is driven towards the ground after time instant 500. When approaching ground, pressure level increases, and at time instant 510 the rear ground support 10 is detected to be adequately positioned on the ground (and is stopped). For example, pressure level above 60 bars or another suitable trigger level may indicate that the ground support is engaged to the ground.

At time instant 520 pushing of the ground pin 9 towards the ground is started, which causes increase in the pressure detected at the rear ground support 10. At time instant 530 the rear ground support pressure has reached a threshold value for adequate ground pin ground contact state and the ground pin may be detected to adequately supported on the ground (and pushing of the pin towards the ground may be stopped). For example, pressure level above 140 bars or another trigger level may indicate adequate ground pin contact state.

The drilling rig 1 may comprise functionality to assist to or automatically perform correction for feed aligning errors. If there is change of alignment due to pushing the ground pin 5 and/or the rear support to the ground, an automatic alignment correction procedure may be carried out. Thus, orientation change (caused by driving the ground pin/support onto the ground) may be defined, on the basis of one or more of the orientation of the boom 3, orientation of the feed beam 5, direction of the hole, and direction and inclination of the carrier 2. To compensate for the orientation change, the orientation of the feed beam 5 may be automatically adjusted before applying drilling force. The adjustment may be caused by controlling one or more of the feed beam position, the boom position, or the carrier position (position herein comprising ground position and/or orientation/inclination). For example, the compensation related features illustrated in EP2725184 may be applied.

The control unit 12, or another control unit of the drilling rig, may be configured to control orientation of the boom 3, the carrier 2, and/or the feed beam 5 in response to detecting the loss of adequate ground support for the feed beam during drilling.

In some embodiments, the drilling rig 1, or the control unit 12 thereof, is configured to automatically control orientation of at least one of the boom, the carrier, or the feed beam to compensate for orientation change caused by change or loss of adequate ground support during drilling, detected based on the ground support force information (of carrier ground support 10) received in block 300. Such method may comprise:

- receiving hole parameter data indicative of direction of a drilled hole (this may be received already at the positioning stage 21 from the drilling plan),
- monitoring received support force information indicative of force applied by carrier ground support to the ground,
- detecting (automatic) orientation correction condition on the basis of the received support force information (e.g. if the associated rear ground support force is detected to fall below at least one threshold parameter,
- defining orientation correction control parameter set on the basis of the hole parameter data, and the received support force information and/or an input indicative of orientation change caused, such as data from an inclinometer or a feed beam orientation sensor, and
- controlling orientation of at least one of the boom, the carrier, or the feed beam on the basis the defined orientation correction parameter set, to ensure alignment of the feed beam to the hole direction.

It is to be appreciated that various further features may be complement or differentiate at least some of the above-illustrated embodiments. For example, there may be further user interaction and/or automation functionality further facilitating the operator to monitor and/or control above-illustrated operations and select appropriate action to overcome an issue regarding ground support for the feed beam for drilling.

An electronic device comprising electronic circuitries may be an apparatus for realizing at least some embodiments illustrated above, such as the method illustrated in connection with FIG. 3. The apparatus may be comprised in at least one computing device connected to or integrated into a control system of the drilling rig. Such control system may be an intelligent on-board control system controlling operation of various sub-systems of the rig, such as a hydraulic system, a motor, a rock drill, etc. Such control systems are often distributed and include many independent modules connected by a bus system of controller area network (CAN) nodes, for example.

Figure 6:
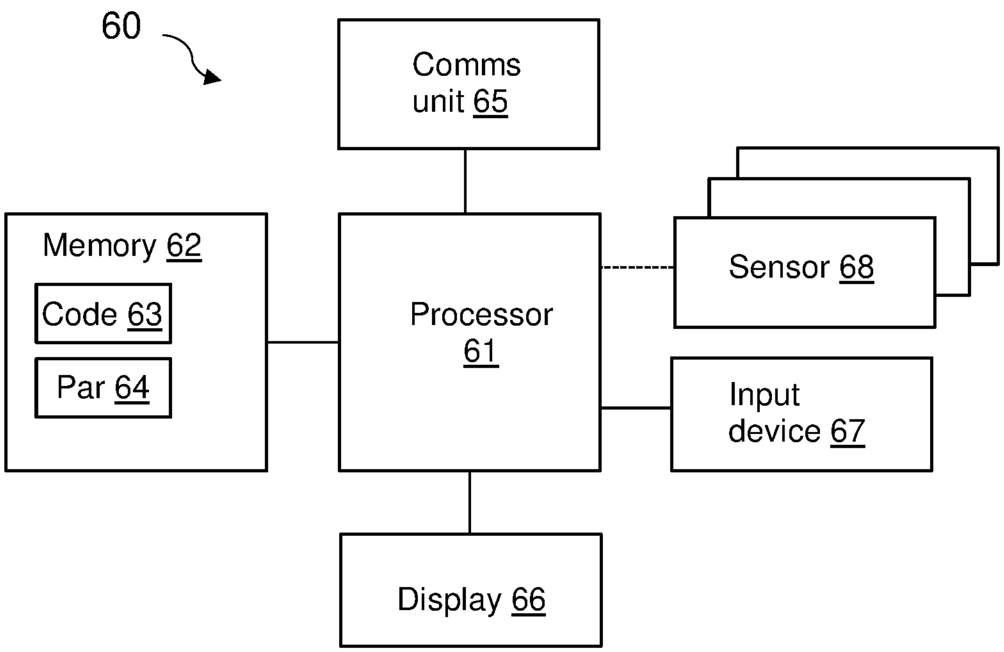
FIG. 6 illustrates an example apparatus capable of supporting at least some embodiments.

FIG. 6 illustrates a simplified example apparatus capable of supporting at least some embodiments of the present invention. Illustrated is a device 60, which may be configured to carry out at least some of the embodiments relating to the feed beam ground pin ground contact state related operations illustrated above. In some embodiments, the device 60 comprises or implements the control unit 12.

Comprised in the device 60 is a processor 61, which may comprise, for example, a single- or multi-core processor. The processor 61 may comprise more than one processor. The processor may comprise at least one application-specific integrated circuit, ASIC. The processor may comprise at least one field-programmable gate array, FPGA. The processor may be configured, at least in part by computer instructions, to perform actions.

The device 60 may comprise memory 62. The memory may comprise random-access memory and/or permanent memory. The memory may be at least in part accessible to the processor 61. The memory may be at least in part comprised in the processor 61. The memory may be at least in part external to the device 60 but accessible to the device. The memory 62 may be means for storing information, such as parameters 64 affecting operations of the device. The parameter information in particular may comprise parameter information affecting blocks 310 to 340, such as threshold values.

The memory 62 may be a non-transitory computer readable medium comprising computer program code 63 including computer instructions that the processor 61 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The processor may, together with the memory and computer program code, form means for performing at least some of the above-illustrated method steps in the device.

The device 60 may comprise a communications unit 65 comprising a transmitter and/or a receiver. The transmitter and the receiver may be configured to transmit and receive, respectively, i.a. data and control commands within or outside the mine vehicle. The transmitter and/or receiver may be configured to operate in accordance with global system for mobile communication, GSM, wideband code division multiple access, WCDMA, long term evolution, LTE, 3GPP new radio access technology (N-RAT), wireless local area network, WLAN, and/or Ethernet standards, for example. The device 60 may comprise a near-field communication, NFC, transceiver. The NFC transceiver may support at least one NFC technology, such as NFC, Bluetooth, or similar technologies.

The device 60 may comprise or be connected to a UI, such as the UI 41 illustrated in connection with FIG. 3. The UI may comprise at least one of a display 66, a speaker, an input device 67 such as a keyboard, a joystick, a touchscreen, and/or a microphone. The UI may be configured to display views on the basis of above illustrated embodiments. A user may operate the device and control at least some of above illustrated features. In some embodiments, the user may control the apparatus 30 or the rig 1 via the UI, for example to manually operate the boom 3 or the feed beam 5, tram the rig 1, change working mode, change display views, modify parameters 64, in response to user authentication and adequate rights associated with the user, etc.

The device 60 may further comprise and/or be connected to further units, devices and systems. The processor 61 may be connected to sensor devices 68, such as sensors illustrated above, providing information related to ground pin contact state as above illustrated. Further, the processor 61 may be connected to an actuator control unit or element, such as feed beam 5 actuator controller and/or rear ground support 10 actuator controller for causing associated control actions by an actuator control signal.

The processor 61, the memory 62, the communications unit 65 and the UI may be interconnected by electrical leads internal to the device 60 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases “in one embodiment” or “in an embodiment” in various places throughout this specification are not necessarily all referring to the same embodiment.

As used herein, a plurality of items, elements, and/or materials may be presented in a common list for convenience. However, these lists should be construed as though each member of the list is individually identified as a separate and unique member. Furthermore, the described features, items, elements, or characteristics may be combined in any suitable manner in one or more embodiments.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs “to comprise” and “to include” are used in this document as open limitations that neither exclude nor require the existence of also un-recited features. The features recited in depending claims are mutually freely combinable unless otherwise explicitly stated. Furthermore, it is to be understood that the use of “a” or “an”, that is, a singular form, throughout this document does not exclude a plurality.

The invention claimed is:

1. A mobile drilling rig, comprising:

a carrier;

a ground support attached to the carrier for supporting the carrier on the ground;

a drilling boom attached at a first end to the carrier;

a feed beam attached to a second end of the drilling boom;

a drilling unit attached movably along the feed beam;

a ground pin attached to the feed beam for supporting the feed beam onto the ground; and control means for controlling ground support of the rig for drilling, wherein the control means are configured for:

receiving ground support force information indicative of force applied by the ground support to the ground, and detecting a ground contact state of the ground pin on the basis of the received ground support force information by comparing the received ground support force information to at least one predetermined threshold value, wherein the ground contact state indicates whether the feed beam is adequately supported on the ground for drilling.

2. The drilling rig of claim 1, wherein the ground support force information is indicative of hydraulic pressure received from a pressure sensor attached to a cylinder actuating the ground support.

3. The drilling rig of claim 1, wherein the ground support includes a rear support attached to a rear portion of the carrier, and the ground support force information is indicative of force applied by the rear support to the ground during driving of the ground pin onto into the ground.

4. The drilling rig of claim 1, wherein the further carrier includes a track system, wherein tracks of the track system are pivoted to an oscillation shaft and at least one oscillation cylinder is provided to control relative positions of the tracks, and wherein the control means are configured for:

receiving oscillation cylinder hydraulic pressure information, indicative of hydraulic pressure in the at least one oscillation cylinder of the track system, affected by driving the ground pin onto into the ground, and detecting the ground contact state of the ground pin on a basis of the received oscillation cylinder hydraulic pressure information.

5. The drilling rig of claim 1, wherein the control means are configured for controlling a further extension of the ground pin onto the ground in response to detecting the ground support force information failing to meet at least one threshold value for allowing drilling by the drilling rig.

6. The drilling rig of claim 1, wherein the control means are configured to monitor the ground contact state before starting drilling and allow automatic transition to a drilling mode in response to detecting the ground contact state to meet predetermined ground support drilling mode criterion.

7. The drilling rig of claim 1, wherein the control means are configured to receive the ground support force information and monitor the ground contact state during drilling, and the control means are further configured to detect loss of adequate ground support for the feed beam in response to detecting, based on the received ground support force information, that the force applied by the ground support to the ground meets a predetermined loss of support threshold value.

8. The drilling rig of claim 7, wherein the control means are further configured to control orientation of at least one of the boom, the carrier, or the feed beam in response to detecting the loss of adequate ground support for the feed beam.

9. The drilling rig of claim 6, wherein the control means are further configured for causing suspension of current autonomous operation and transmission of an alert message to a remote communication device for outputting an alert to a remote operator in response to:

repeatedly detecting failure to meet a threshold value for transitioning from a positioning mode to the drilling mode, or detecting loss of ground support for the feed beam during drilling on the basis of the ground support force information.

10. A method for ground-supporting a drilling rig comprising a carrier, a ground support attached to the carrier for supporting the carrier on the ground, a drilling boom attached at a first end to the carrier, a feed beam attached to a second end of the drilling boom, a drilling unit attached movably along the feed beam, a ground pin attached to the feed beam for supporting the feed beam onto the ground, the method comprising:

receiving ground support force information indicative of a force applied by the ground support to the ground; and detecting a ground contact state of the ground pin on a basis of the received ground support force information by comparing the received ground support force information to at least one predetermined threshold value, wherein the ground contact state indicates whether the feed beam is adequately supported to the ground for drilling.

11. The method of claim 10, wherein the support force information is indicative of hydraulic pressure received from a pressure sensor attached to a cylinder actuating the ground support.

12. The method of claim 10, wherein the ground support includes a rear support attached to a rear portion of the carrier, the ground support force information being indicative of a force applied by the rear support to the ground during driving the ground pin onto into the ground.

13. The method of claim 10, wherein the ground contact state is monitored before starting drilling and automatic transition to a drilling mode is allowed in response to detecting that the ground contact state has met a predetermined ground support drilling mode criterion.

14. The method of claim 10, wherein the ground support force information is received and the ground contact state is monitored during drilling, and a loss of adequate ground support for the feed beam is detected in response to detecting, based on the received ground support force information, that the force applied by the ground support to the ground meets a predetermined loss of support threshold value.

15. A computer program comprising code for, when executed in a data processing apparatus of a mobile drilling rig according to claim 1, to cause a method to be performed, the method comprising:

receiving ground support force information indicative of a force applied by the ground support to the ground; and detecting a ground contact state of the ground pin on a basis of the received ground support force information by comparing the received ground support force information to at least one predetermined threshold value, wherein the ground contact state indicates whether the feed beam is adequately supported to the ground for drilling.

* * * * *